Patented June 6, 1939

2,161,331

UNITED STATES PATENT OFFICE 2,161,331

MEROCYANINES AND A PROCESS FOR THE PREPARATION THEREOF

Leslie G. S. Brooker and Russel H. Van Dyke, Rochester, N. Y., assignors, by mesne assignments, to Eastman Kodak Company, Jersey City, N. J., a corporation of New Jersey No Drawing. Application July 5, 1935, Serial No. 29,917

9 Claims. (Cl. 260—240)

This invention relates to dyes of a new class related in certain respects to dyes of the cyanine class. It has recently been proposed to call the dyes of this new class merocyanine dyes. A number of dyes of the merocyanine class have been described by Leslie G. S. Brooker in his copending application Serial No. 739,502, filed August 11, 1934.

In the above-referred to copending application of Leslie G. S. Brooker, dyes of the following general formula are described:

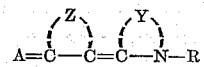

wherein A represents oxygen or sulfur, R represents an alkyl group and Y and Z represent the non-metallic atoms necessary to complete a five-membered or six-membered heterocyclic nucleus. Specifically described are dyes wherein A represents oxygen, Z represents the non-metallic atoms necessary to complete a five-membered rhodanine nucleus or a six-membered 2,4,6-triketohexahydropyrimidine nucleus and Y represents the non-metallic atoms necessary to complete a six-membered pyridine, quinoline or naphthoquinoline nucleus. Such dyes were prepared by condensing a quaternary salt of a 2-halogeno-pyridine, a 2-halogeno-quinoline or a 2-halogeno-naphthoquinoline with a rhodanine or a 2,4,6-triketohexahydropyrimidine, in the presence of an acid binding agent.

Now we have found that dyes of the above formula can be prepared by condensing a quaternary salt of a 2-substituted mercapto-pyridine or quinoline with a heterocyclic compound, containing a nuclear methylene group adjacent to a nuclear carbonyl or thiocarbonyl group. We have further found that new dyes of the above formula can be prepared by employing a quaternary salt of a 1-substituted mercaptobenzothiazole or benzoxazole. All of the dyes which can be prepared by our new process are useful for improving and extending the normal sensitivity of photographic gelatino-silver-halide emulsions.

The object of our invention, therefore, is to provide new mero-cyanine dyes. A further object is to provide a process for the preparation of mero-cyanine dyes. Other more specific objects will become apparent upon a complete perusal of this specification.

Our new process can be illustrated by the following specific reactions:

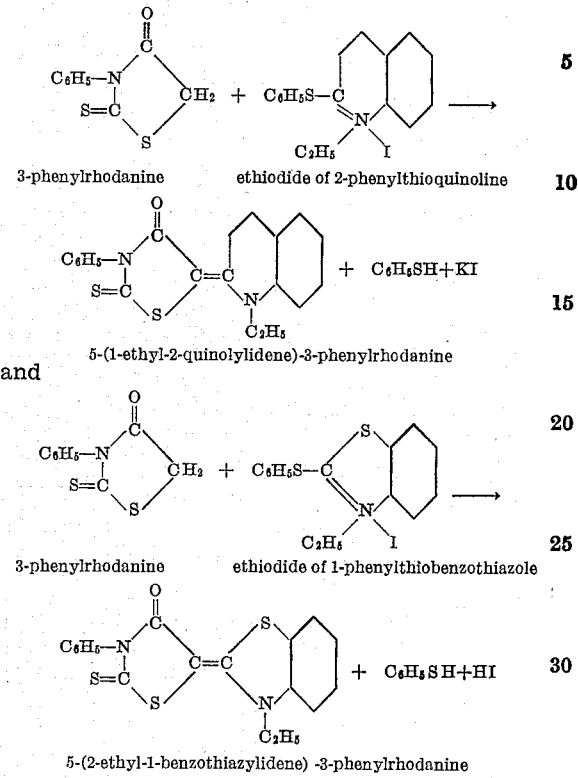

The condensations are effected by heating the components in alcohol or other suitable solvent with a variety of basic condensing agents, such as triethylamine, sodium acetate, sodium carbonate, caustic soda or by heating the components in a basic solvent, such as pyridine. Among the organic bases which can be used to effect the condensations, the strong organic bases, such as triethylamine, are preferable. The condensations take place without the application of heat, but only quite slowly. The 2-substituted-mercapto-pyridines and quinolines used herein are described in the copending application of Leslie G. S. Brooker and Grafton H. Keyes, Serial No. 739,127, filed August 9, 1934 (now United States Patent 2,117,936, dated May 17, 1938). The 1-alkylthiobenzothiazoles and 1-alkylthiobenzoxazoles can be prepared in known manner, e. g. as described in British Patent 424,559.

The following examples serve to illustrate our invention, but are not intended to be limiting except as is indicated in the appended claims.

EXAMPLE 1.—5-(1-ethyl-2-quinolylidene)-rhodanine 0.44 g. (1 mol.) of rhodanine, 1.3 g. (1 mol.) of 2-phenylthioquinoline ethiodide and 0.36 g. (1.05 mol.) of triethylamine were refluxed in 15 cc. of absolute ethyl alcohol for fifteen minutes. The dye separated from the chilled solution. Yield 69%. Following recrystallization from glacial acetic acid, the dye was obtained in the form of red crystals with a green reflex. Yield 52%. 2-(n-butylthio)-, 2-(p-tolylthio)-, 2(β-naphthylthio)- or 2-(1-benzothiazolylthioquinoline can also be condensed with rhodanine to yield the same mero-cyanine.

EXAMPLE 2.—3-ethyl-5-(1-ethyl-2-quinolylidene)-rhodanine 0.32 g. (1 mol.) of 3-ethylrhodanine, 0.8 g. (1 mol.) of 2-phenylthioquinoline ethiodide and 0.21 g. (1.05 mol.) of triethylamine were refluxed in 15 cc. of absolute ethyl alcohol for fifteen minutes. The dye separated from the chilled solution. Yield 69%. Following recrystallization from glacial acetic acid, the dye was obtained as red crystals. Yield 50%.

EXAMPLE 3.—5-(1-ethyl-2-quinolylidene)-3-phenyl-rhodanine 0.52 g. (1 mol.) of 3-phenylrhodanine, 1.0 g. (1 mol.) of 2-phenylthioquinoline ethiodide and 0.26 g. (1.05 mol.) of triethylamine were refluxed in 15 cc. of absolute ethyl alcohol for fifteen minutes. The dye separated from the chilled solution. Yield 88%. Following recrystallization of the dye from glacial acetic acid, the dye was obtained as brownish red crystals with green reflex. Yield 66%.

By employing 2-phenylthiopyridine ethiodide with 3-phenylrhodanine, 5-(1-ethyl-2-pyridylidene)-3-phenylrhodanine is obtained in the form of reddish-brown crystals upon recrystallization from methyl alcohol.

EXAMPLE 4.—3-ethyl-5-(1-ethyl-2-quinolylidene)-1-phenyl-2-thiohydantoin 1.1 g. (1 mol.) of 3-ethyl-1-phenyl-2-thiohydantoin, 2.0 g. (1 mol.) of 2-phenylthioquinoline ethiodide and 0.53 g. (1.05 mol.) of triethylamine were refluxed for fifteen minutes in 20 cc. of absolute ethyl alcohol. The dye separated from the chilled solution. Yield 73%. Following recrystallization from methyl alcohol (365 cc. per gram of dye), the dye was obtained as dark greenish crystals.

The 3-ethyl-1-phenyl-2-thiohydantoin used in this preparation was prepared by heating 17.0 g. (1 mol.) of phenyl glycine ethyl ester and 8.7 g. (1 mol.) of ethyl isothiocyanate in an open flask on the steam bath for 48 hours. The heavy viscous syrup so obtained was diluted with methyl alcohol, precipitating the compound. Following recrystallization from methyl alcohol (10 cc. per gram of compound), the compound was obtained in a yield of 50%.

EXAMPLE 5.—3-ethyl-5-(1-ethyl-2-quinolylidene)-2-thio-2,4 (3,5)-oxazoledione 0.7 g. (1 mol.) of 3-ethyl-2-thio-2, 4 (3, 5)-oxazoledione, 2.0 g. (1 mol.) of 2-phenylthioquinoline ethiodide and 0.53 g. (1.05 mol.) of triethylamine were refluxed in 20 cc. of absolute ethyl alcohol for fifteen minutes. The dye separated from the chilled solution. Yield 63%. Following recrystallization from methyl alcohol (300 cc. per gram of dye), the dye was obtained as orange prisms. Yield 53%.

EXAMPLE 6.—5-(2-ethyl-1-benzothiazylidene)-rhodanine 1.1 g. (1 mol.) of 1-methylthiobenzothiazole ethiodide 0.44 g. (1 mol.) of rhodanine and 0.35 g. (1.05 mol.) of triethylamine were refluxed in 20 cc. of absolute ethyl alcohol for fifteen minutes. The dye separated from the chilled solution. Yield 75%. Following recrystallization from pyridine (30 cc. per gram of dye), the dye was obtained as a bright yellow powder. Yield 45%.

The 1-methylthiobenzothiazole ethiodide used in this preparation was made by heating 1-methylthiobenzothiazole (20 g.; 1 mol.) and ethyl iodide (21.7 g.; 1.25 mol.) for 48 hours on the steam bath. The yield was 31%.

The 1-methylthiobenzothiazole used above was prepared by treating 1-mercaptobenzothiazole (50 g.; 1 mol.) with dimethyl sulfate (57 g.; 1.5 mol.) in the presence of aqueous sodium hydroxide (57 g.; 1.5 mol.). Yield 92%. Following distillation the 1-methylthiobenzothiazole was obtained as a clear liquid. Yield 80%.

1-methylthiobenzoxazole and its ethiodide, as well as 1-phenylthiobenzoxazole, 1-phenylthiobenzoxazole, 1-(n-butylthio)-benzothiazole and 1-(n-butylthio)-benzoxazole, and their ethiodides can be made in the same manner. These ethiodides can all be condensed with rhodanines, hydantoins, 2,4 (3,5)-oxazolediones and the like. See Example 13.

EXAMPLE 7.—3-ethyl-5-(2-ethyl-1-benzothiozylidene)-rhodanine 0.53 g. (1 mol.) of 3-ethylrhodanine, 1.1 g. (1 mol.) of 1-methylthiobenzothiazole ethiodide and 0.35 g. (1.05 mol.) of triethylamine were refluxed in 15 cc. of absolute ethyl alcohol for fifteen minutes. The dye separated from the chilled solution. Yield 93%. Following recrystallization from pyridine (25 cc. per gram of dye), the dye was obtained as yellow crystals with a blue reflex. Yield 75%.

EXAMPLE 8.—5-(2-ethyl-1-benzothiazylidene)-3-phenyl-rhodanine 0.7 g. (1 mol.) of 3-phenylrhodanine, 1.1 g. (1 mol.) of 1-methylthiobenzothiazole ethiodide and 0.35 g. (1.05) mol.) of triethylamine were refluxed in 15 cc. of ethyl alcohol for fifteen minutes. The dye separated from the chilled solution. Yield 90%. Following recrystallization from pyridine (90 cc. per gram of dye), the dye was obtained as bright yellow crystals. Yield 73%.

EXAMPLE 9.—3-ethyl-5-(2-ethyl-1-benzothiazylidene)-2-thio-2,4 (3,5)-oxazoledione 0.48 g. (1 mol.) of 3-ethyl-2-thio-2,4 (3,5)-oxazoledione, 1.1 g. (1 mol.) of 1-methylthiobenzothiazole ethiodide and 0.35 g. (1.05 mol.) of triethylamine were refluxed for fifteen minutes in 15 cc. of absolute ethyl alcohol. The dye separated from the chilled solution. Yield 75%. Following recrystallization from glacial acetic acid (20 cc. per gram of dye), the dye was obtained as pale yellow crystals. Yield 55%.

EXAMPLE 10.—5-(2-ethyl-1-benzothiazylidene)-1,3-diphenyl-2-thiohydantoin 0.9 g. (1 mol.) of 1,3-diphenyl-2-thiohydantoin, 1.1 g. (1 mol.) of 1-methylthiobenzothiazole ethiodide and 0.35 g. (1.05 mol.) of triethylamine were refluxed in 15 cc. of absolute ethyl alcohol for fifteen minutes. The dye separated from the chilled solution. Yield 77%. Following recrystallization from glacial acetic acid (35 cc. per gram of dye), the dye was obtained as dull yellow crystals. Yield 40%.

EXAMPLE 11.—1-(2-ethyl-1-benzothiazylidene)-2(1)-thionaphthenone 0.5 g. (1 mol.) of 2(1)-thionaphthenone, 1.1 g. (1 mol.) of 1-methylthiobenzothiazole ethiodide and 0.35 g. (1.05 mol.) of triethylamine were refluxed in 20 cc. of absolute ethyl alcohol for fifteen minutes. The dye separated from the chilled solution. Yield 80%. Following recrystallization from glacial acetic acid (25 cc. per gram of dye), the dye was obtained as yellow crystals. Yield 60%.

EXAMPLE 12.—5-(2-ethyl-1-benzothiazylidene)-2-diphenylamino-4(5)-thiazolone 0.45 g. (1 mol.) of 2-diphenylamino-4(5)-thiazolone, 0.56 g. (1 mol.) of 1-methylthiabenzothiazole ethiodide and 0.18 g. (1.05 mol.) of absolute ethyl alcohol were refluxed in absolute ethyl alcohol (15 cc.) for fifteen minutes. The dye separated from the chilled solution. The yield of crude dye was 30%. Following recrystallization from glacial acetic acid (50 cc. per gram of dye), the dye was obtained as a pale yellow powder. Yield 23%.

EXAMPLE 13.—3-ethyl-5-(2-ethyl-1-benzoxazylidene)-rhodanine 1.61 g. (1 mol.) of 3-ethylrhodanine, 3.22 (1 mol.) of 1-methylthiobenzoxazole ethiodide and 1.06 g. (1.05 mol.) of triethylamine were refluxed for fifteen minutes in 35 cc. of absolute ethyl alcohol. The dye separated from the chilled solution. Yield 50%. The dye was recrystallized from glacial acetic acid and obtained as yellow crystals. Yield 35%.

The 1-methylthiobenzoxazole ethiodide used in this preparation was made according to the process given in Example 6 for 1-methylthiobenzothiazole ethiodide.

EXAMPLE 14.—α-(2-ethyl-1-benzothiazylidene)-benzoylacetonitrile 0.24 g. (1 mol.) of benzoylacetonitrile, 0.56 g. (1 mol.) of 1-methylthiobenzothiazole ethiodide and 0.18 g. (1.05 mol.) of triethylamine were refluxed in 15 cc. of absolute ethyl alcohol for fifteen minutes. The dye separated from the chilled solution. Yield 70%. Following recrystallization from glacial acetic acid (25 cc. per gram of dye), the dye was obtained as a colorless compound.

From these examples it is apparent that a large number of mero-cyanine dyes can be prepared by condensing a quaternary salt of a 2-substituted mercapto-pyridine or quinoline or a quaternary salt of a 1-substituted mercapto-benzothiazole or benzoxazole with a heterocyclic compound containing a nuclear methylene group adjacent to a nuclear carbonyl or thiocarbonyl group.

What we claim as our invention and desire to be secured by Letters Patent of the United States is:

1. A process for preparing a merocyanine dye comprising condensing, in the presence of a trialkylamine condensing agent having a dissociation constant of the order of that of triethylamine, a cyclammonium alkyl quaternary salt containing a reactive alkylthio group in the alpha position to the ammonium nitrogen atom, with a heterocyclic compound containing a nuclear reactive methylene group adjacent to a nuclear group selected from the group consisting of carbonyl and thiocarbonyl groups.

2. A process for preparing a merocyanine dye comprising condensing, in the presence of a trialkylamine condensing agent having a dissociation constant of the order of that of triethylamine, a cyclammonium alkyl quaternary salt containing a reactive alkylthio in the alpha position to the ammonium nitrogen atom, with a heterocyclic compound containing a nuclear reactive methylene group adjacent to a nuclear carbonyl group.

3. A process for preparing a merocyanine dye comprising condensing, in the presence of triethylamine condensing agent, a cyclammonium alkyl quaternary salt containing a reactive alkylthio group in the alpha position to the ammonium nitrogen atom with a heterocyclic compound containing a nuclear reactive methylene group adjacent to a nuclear carbonyl group.

4. A process for preparing a merocyanine dye comprising condensing, in the presence of a trialkylamine condensing agent having a dissociation constant of the order of that of triethylamine, a 2-alkylthioquinoline alkyl quaternary salt with a heterocyclic compound containing a nuclear reactive methylene group adjacent to a nuclear carbonyl group.

5. A process for preparing a merocyanine dye comprising condensing, in the presence of triethylamine condensing agent, a 2-alkylthioquinoline alkyl quaternary salt with a heterocyclic compound containing a nuclear reactive methylene group adjacent to a nuclear carbonyl group.

6. A process for preparing a merocyanine dye comprising condensing, in the presence of a trialkylamine condensing agent having a dissociation constant of the order of that of triethylamine, a 1-alkylthiobenzothiazole alkyl quaternary salt with a heterocyclic compound containing a nuclear reactive methylene group adjacent to a nuclear carbonyl group.

7. A process for preparing a merocyanine dye comprising condensing, in the presence of triethylamine condensing agent, a 1-alkylthiobenzothiazole alkyl quaternary salt with a heterocyclic compound containing a nuclear reactive methylene group adjacent to a nuclear carbonyl group.

8. A process for preparing a merocyanine dye comprising condensing, in the presence of a trialkylamine condensing agent having a dissociation constant of the order of that of triethylamine, a 1-alkylthiobenzoxazole alkyl quaternary salt with a heterocyclic compound containing a nuclear reactive methylene group adjacent to a nuclear carbonyl group.

9. A process for preparing a merocyanine dye comprising condensing, in the presence of triethylamine condensing agent, a 1-alkylthiobenzoxazole alkyl quaternary salt with a heterocyclic compound containing a nuclear methylene group adjacent to a nuclear carbonyl group.

LESLIE G. S. BROOKER.
RUSSEL H. VAN DYKE.